United States Patent Office 3,499,165
Patented Mar. 3, 1970

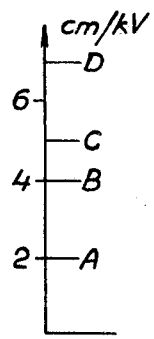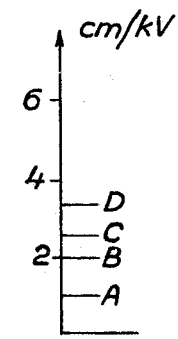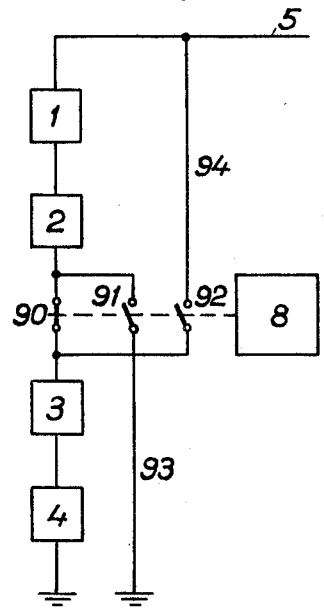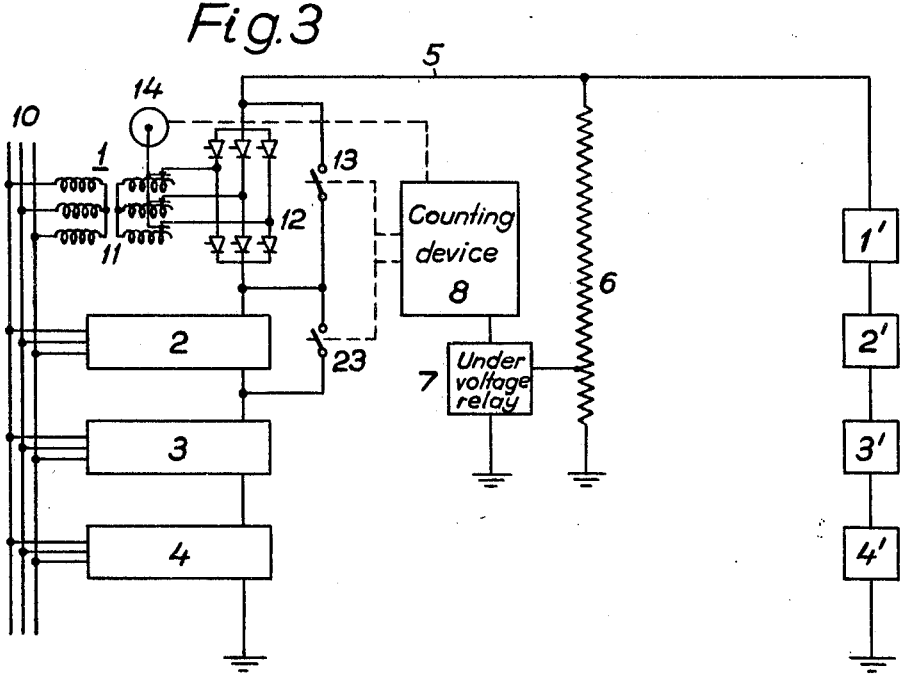

3,499,165
TRANSMISSION SYSTEM FOR HIGH VOLTAGE DIRECT CURRENT
Vjekoslav Madzarevic, Ludvika, Sweden, and Hans Witt, Pinneberg, Germany, assignors to Allmänna Svenska Elektriska Aktiebolaget, Vasteras, Sweden, a Swedish corporation
Continuation-in-part of application Ser. No. 358,382, Apr. 8, 1964. This application June 22, 1967, Ser. No. 648,124
Int. Cl. H02j 1/00
U.S. Cl. 307—82
4 Claims

ABSTRACT OF THE DISCLOSURE

The necessary insulation for a high voltage direct current (HDV) line is reduced by providing means for immediately decreasing the line voltage when disturbances caused by decreased insulator resistance appear on the line.

PRIOR APPLICATION

This application is a continuation-in-part of application Ser. No. 358,382, filed Apr. 8, 1964, now abandoned.

BACKGROUND OF THE INVENTION

Field of the invention

The invention relates to an overhead high voltage direct current line and especially to the protection and insulation of the line.

PRIOR ART

It is known that, in calculating electric power overhead lines, account must be taken of different atmospheric disturbances and types of weather when determining the length of the leakage path of the insulators. In order to be sure that the insulation of the line is always sufficient, one must assume the worst possible types of weather even if these occur very seldom and have short duration. Neither must one disregard the fact that two weather situations each unfavorable and seldom occurring could arise at the same time, making the strain on the insulation even greater. An especially troublesome type of disturbance are the salt storms which occur in certain coastal areas. Even if they occur very seldom, at intervals of several years, and have short duration, power lines in such areas must be dimensioned for these exceptional strains. One may thereby be forced to increase the leakage path to about double the value normally used in order to be sure that the line insulation is always sufficient.

If it were possible to decrease the operating voltage on a line which is subjected to such insulation-reducing weather disturbances that insulation faults occur to such a value that the faults disappear, it would be possible to build overhead lines with considerably lower insulation levels than is now the case. This applies especially in such areas which from the insulation point of view are regarded as dirty areas. With such a construction, the insulator strings could be made considerably shorter and this would have the result that their swinging in a side wind is less. The frameworks which support the insulators could be made shorter and weaker and this has the result in its turn that pillars, bars and foundation may be dimensioned according to quite different norms and considerable savings in plant and maintenance costs would ensue.

With the type of interconnected alternating current networks which now occur, it is impossible to temporarily lower the voltage on a line which is especially subject to atmospheric disturbances. The only possibility is to raise the insulation level so much that the faults which might arise because of said disturbances may be overcome.

With transmission systems with high voltage direct current, such a procedure is however possible because of the special construction of the converter stations. To this is added also the fact that the rectifiers tolerate a certain overloading during shorter times and therefore during intervals with lowered operating voltage, the current may be increased, and in this way the decrease in transmitted power is not so great as the voltage decrease would imply. If the line at the moment of the disturbance merely transmits half the nominal power, the voltage may be lowered to half and the current increased to maximum value, the transmitted power being thereby not influenced at all by the voltage decrease. In other words, the flash-over voltage of the insulators of an overhead line does not have a fixed value but is greatly dependent on outer circumstances, especially the weather and the pollution of the insulators. Smaller faults on the insulators also decrease the flash-over voltage even if the damage is so little that the flash-over voltage may be sufficiently high in normal circumstances.

SUMMARY OF THE INVENTION

The present invention relates to a transmission system for high voltage direct current with air conduits suspended on insulators. The invention is characterized in that the insulation level of the network is chosen only somewhat higher than the nominal operating voltage and that means are present for immediate lowering of the operating voltage as soon as disturbances of the type which are caused by lowered flash-over voltage occur in the transmission system.

The most usual reason why the insulation strength of a power network sinks is that the atmospheric humidity increases. Fog and dew in combination with impurities on the insulators, such as dust, soot, salt or the like, have a markedly damaging effect on the insulation. It is therefore probable that an earth fault which occurs in the presence of dew or fog will soon be followed by several similar faults. One can therefore choose repeated earth faults with short intervals as a criterion for the fact that the flash-over voltage of the conduit is exceeded and that the voltage should be lowered. The voltage decrease may therefore be controlled automatically with the help of earth fault relays and is carried out after a number of faults occur within a certain time.

BRIEF DESCRIPTION OF THE DRAWINGS

FIGURES 1 and 2 are diagrams showing leakage path lengths;

FIGURES 3 and 4 show arrangements according to the invention for reducing the voltage on a line.

DESCRIPTION OF THE PREFERRED EMBODIMENTS

Figure 5:
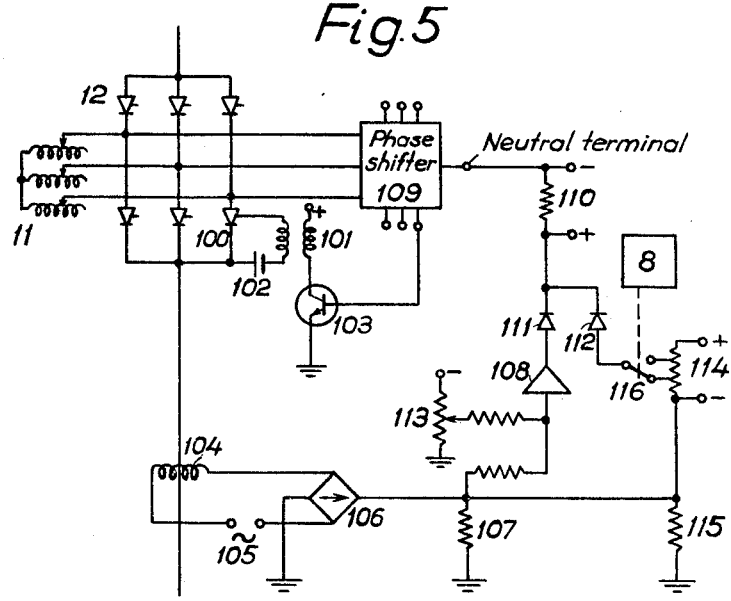
FIGURE 5 shows a converter control arrangement.

FIGURE 3 shows a converter station comprising four static converters 1–4 of which the converter 1 is shown more in detail. The DC sides of said converters are connected in series between a transmission line 5, and earth while the AC sides are connected in parallel to an AC network 10. A similar converter station with four converters 1'–4' and an AC network 10' is connected to the other end of said transmission line, one of said stations being a rectifier station, the other being an inverter station. The two stations are however constructed in the same way.

The transmission line 5 is provided with an earth fault indicator comprising a resistive voltage divider 6 connected between the line 5 and earth. An under-voltage relay means 7 is connected between a tap on the lower part of said voltage divider and earth. As will be explained later, an earth fault in a DC transmission system automatically results in a decrease of the line voltage so that the under-voltage relay means gives an output signal when an earth fault occurs. On the other hand, said output signal may be used to block all the converters of the system so that the line will be voltageless; after a certain time a deblocking attempt will be made and, if the earth fault is eliminated, the power transmission will be continued. If, however, the earth fault is still there a new output signal from the under-voltage relay means results in a new blocking of the system and so on.

On the other hand, said under-voltage relay means may be connected to a counting device 8, counting the output signals from said under-voltage relay means and provided with an output circuit preset for a certain number of signals from the under-voltage relay means so that when said number of signals has been reached an output signal is given from said counting device, showing that some kind of persistent earth fault exists.

Said last output signal can be used in different ways for reducing the direct voltage of the converter stations.

As mentioned above, the converters are parallel-connected with isolating switches 13, 23, and by closing said switches, the direct voltage of the corresponding converter is short circuited so that voltage of the whole station is decreased by the amount of said short circuited voltage. Thus, said switches 13, 23 may be controlled from the output side of said counting device so that upon a signal from the counting device, the voltage is reduced by closing one or more of said isolating switches in both stations.

A voltage reduction could also be carried out by means of the tap selectors on the converted transformers. Said tap selectors could be controlled by a motor 14 which in its turn can be controlled from the counting device 8 so that at a signal from this device, the motor 14 is started and moves the tap selector in a direction corresponding to a decrease of the voltage on the DC side of the converter. It is to be noted that a static current converter always can be regarded as a voltage converter with an AC voltage on the one side and a DC voltage on the other side independent of whether the current converter operates in rectifier or inverter operation. And it is further to be pointed out that the voltage decrease must be carried out at both ends of the transmission line, that is, in a rectifier station as well as in an inverter station. Thus it is seen that the tap selectors have to be moved in the same direction in both stations.

In FIGURE 4 is shown another way to reduce the direct voltage of the line. FIGURE 5 shows a station with four converters 1–4 connected in series between earth and the transmission line 5. Said series connection can be interrupted by a switch 90 between the converters 1 and 3. The two halves of the station can then be parallel-connected by a parallel connecting means 9 comprising two switches 91 and 92 and conductors 93, 94.

The switches 90, 91 and 92 are operated from the output side of the counting device 8 so that at an output signal from said device switch 90 is opened and switches 91, 92 are closed so that the converters 1, 2 are parallel-connected to the converters 3, 4 and thus the direct voltage of the station and the line is halved. As upon a halving of the voltage, the current has to be doubled if the same transmitted power is to be maintained, it is seen that said power could be maintained without changing the current in the different converters.

In FIGURE 5 is shown the more detailed control principle for the rectifiers in a converter. The rectifier 100 in the bridge 12 is provided with a control transformer 101 the secondary winding of which is connected, in series with a bias voltage source 102, to the control electrode and cathode of the rectifier. The primary winding of the control transformer is connected with one terminal to a positive voltage source and with the other terminal to earth through a transistor 103. The base electrode of this transistor is connected to an alternating reference voltage, one for each of the rectifiers, in series with a direct voltage system common to all the rectifiers of the converter.

The alternating reference voltages for the rectifiers are taken from their commutation voltages through a phase shifting means 109 in such a way that during the positive half period of the commutation voltage for a rectifier, the proper reference voltage varies from a positive to a negative value. In other words, if the commutation voltage for a rectifier, which is the difference between the phase voltages of that rectifier and the preceding rectifier in the commutation group, is regarded as a sinusoidal voltage, the reference voltage is obtained by phase shifting the commutation voltage 90° so that a con-sinusoidal voltage is obtained. It is seen that when a sine is positive, that is from 0° to 180°, the cosine varies from one through zero to minus one.

The phase shifter 109 is provided with a common neutral output terminal and output phase terminals each connected to a transistor 103 for the respective rectifier.

The common neutral of the phase shifter is connected to the above mentioned common direct voltage system, first comprising a direct bias voltage fed to a resistor 110. Said bias voltages is equal to the amplitude of the reference voltages. To the lower end of resistor 110 are connected two diodes 111 and 112 in parallel. To the diode 111 is connected a current regulator comprising an amplifier 108 and to the diode 112 a device which could be called a commutation margin regulating means.

To the input side of the amplifier 108 of the current regulator are connected two input circuits, one comprising a presetting potentiometer 113 for presetting a desired current value and the other a measuring transducer 104 fed with an AC voltage 105 and having an output rectifier bridge 106 the direct voltage of which is connected to a resistor 107. In this way, the voltage over resistor 107 will be proportional to the direct current in the rectifier bridge 12 of the converter. The amplifier 108 is influenced by a voltage which is proportional to the difference between the real current of the converter and the desired current and the amplifier is so arranged that if said real current is equal to or exceeds the preset current value, the output voltage from the amplifier will be positive.

Figure 5A:
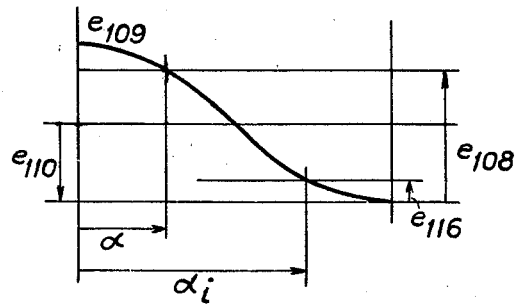
FIGURE 5a is an explanatory chart.

Referring now to FIGURE 5a, the curve $e_{109}$ corresponds to the proper output phase voltage of the phase shifter 109 during the interval of 180° in which the commutation voltage for the rectifier 100 is positive. The bias voltage over resistor 110 is marked $e_{110}$ and the regulator voltage is marked $e_{108}$. With proper polarity of said three voltages, it is seen that, when voltage $e_{109}$ exceeds the difference between voltage $e_{108}$ and $e_{110}$, the base electrode of transistor 103 will become positive so that the transistor becomes conductive. A current will flow up in the primary of the transformer 101 inducing a voltage on the secondary side of this transformer which will make the rectifier 100 conducting with a certain delay angle $\alpha$ in relation to the beginning of the positive half period of its commutation voltage.

It has been found that by this system, the direct voltage of the converter will be proportional to the difference between the voltages $e_{108}$ and $e_{110}$ which means that if $e_{108}$ is greater than $e_{110}$, the angle $\alpha$ will be less than 90° and the direct voltage of the converter will be positive which in its turn results in rectifier operation of the converter. If $e_{108}$ is less than $e_{110}$, $\alpha$ will be between 90° and 180° and the direct voltage of the converter is negative which results in inverter operation.

When presetting the current regulators of the rectifier station and the inverter station, potentiometer 113 in the rectifier station is preset corresponding to a higher current than in the inverter station. Thus when starting the transmission, the direct current in both stations is zero so that a large output voltage $e_{108}$ is obtained from both current regulators. Consequently both stations start as rectifiers and the direct current will increase rapidly. Very soon, however, the current will reach the present value in the inverter station so that the output from its regulator will be zero, giving maximum negative direct voltage corresponding to full inverter operation. However, the rectifier station will continue to increase the direct voltage until the desired direct current preset in this station is obtained.

Looking now at the inverter station, the current regulator in this station is parallel-connected with the so-called commutation margin regulator comprising a potentiometer 114 with two taps connected to a switch 116 and fed with a fixed direct voltage and a further potentiometer 115 fed from the transducer rectifier 106. Thus, if in the inverter station the regulator voltage $e_{108}$ is less than the voltage $e_{116}$ from the switch 116, the diode 111 is blocked so that a maximum delay angle $\alpha_i$ is secured in inverter operation.

It is seen that $\alpha_i$ decreases with increasing direct current in the inverter station so that a certain commutation margin is secured in the inverter station independent of the direct current of the station.

If an earth fault occurs on the transmission line, the fault current will be added to the transmission current of the rectifier station. This means that the real current of this station exceeds the preset current value so that the signal from the regulator amplifier decreases. This causes an increased delay angle $\alpha$ and a decreased direct voltage of the rectifier station so that the direct current of the station is reduced to its normal value. The decreased voltage of the rectifier station, however, also means a reduced current in the inverter station so that an output signal will be delivered from the regulator amplifier of that station, giving a reduced delay angle and thus a reduced negative direct voltage of the station so that the direct current of the station is restored. This, however, causes again an increased current in the rectifier station and then a further decrease of the voltage of this station and this development continues until the transmission voltage is so low that the earth fault current is equal to the current margin, that is the difference between the current settings in the two stations.

Thus, the indication for an earth fault will be a very low transmission voltage and the under voltage relay 7 in FIGURE 3 will be picked up and block the converters in the stations, for instance by disconnecting the feeding voltage to the control transformers 101 in FIGURE 5.

A further possibility of voltage reduction, according to the invention, can be obtained in the following way.

In FIGURE 5, the potentiometer 114 is provided with two taps and during normal operation the switch 116 is connected to the lower tap. In case of a signal from the counting device 8, the switch 116 is moved to its upper position which means that the voltage $e_{116}$, according to FIGURE 5a, is increased so that the direct voltage of the inverter station is decreased. In order to limit the transmission current to its original value, the regulator of the rectifier station will increase the delay angle for this station so that the direct voltage of the station is reduced in a corresponding way and thus a reduction of the transmission voltage is obtained.

Thus, it is seen that the desired reduction of the transmission voltage according to the invention can be obtained in many different ways. Which method should be preferred depends on the other circumstances of the whole plant.

What is claimed is:

1. A high voltage direct current power transmission system comprising at least one rectifier station and one inverter station and a D.C. transmission line connecting said two stations; characterised in that the insulation level of said line is only a little higher than the rated transmission voltage; means for reducing the direct voltage of said converter stations; each converter station comprising a plurality of static converters connected in series on their D.C. sides; said direct voltage reducing means comprising switching means on the D.C. sides of the stations for reducing the number of series connected converters in the stations while leaving at least one converter connected; earth fault indicating means connected to said transmission line; said fault indicating means including means responsive to the line voltage to give an output signal in response to a predetermined low voltage level on the line; means responsive to said fault indicating means output signal for temporarily blocking the transmission system; a counting device the input side of which is connected to said fault indicating means; said counting device giving an output signal after a certain predetermined number of output signals from said fault indicating means; the output side of said counting device being connected to said voltage reducing means in said stations to reduce the voltage upon the giving of such counting device output signal.

2. A high voltage direct current transmission system as claimed in claim 1; characterized in that said switching means comprises by-pass connection means to by-pass at least one of said static converters in each station.

3. A high voltage direct current transmission system as claimed in claim 1; characterized in that said switching means comprises in each station switching means for dividing said series-connected converters into two equal parts and parallel-connecting said two parts.

4. A high voltage direct current transmission system as claimed in claim 1; each station comprising a plurality of static converters each provided with a converter transformer; characterized in that said voltage reducing means comprises tap selectors on said converter transformers and means to operate said tap selectors.

References Cited

UNITED STATES PATENTS

| | | | |
|---|---|---|---|
| 2,909,709 | 10/1959 | Metzetal | 317—22 X |
| 2,942,154 | 6/1960 | Van Ryan | 317—22 |
| 3,309,571 | 3/1967 | Gilker | 317—22 |
| 2,757,321 | 7/1956 | Wallace et al. | 317—22 X |
| 3,253,188 | 5/1966 | Nissel | 317—20 X |
| 3,283,212 | 11/1966 | Davis et al. | 317—22 |
| 3,315,146 | 4/1967 | Paice | 321—45 |
| 3,331,990 | 7/1967 | Johansson | 321—11 X |
| 3,036,257 | 5/1962 | Uhlmann | 321—2 |

ROBERT K. SCHAEFER, Primary Examiner

I. B. JOIKE, Assistant Examiner

U.S. Cl. X.R.

307—87; 317—16, 18, 31; 321—14, 27